3,389,982
METHOD FOR MAKING HIGH STRENGTH
SPHERICAL GLASS BODIES
Charles W. Schott, Pittsburgh, Pa., assignor to Union
Carbide Corporation, a corporation of New York
No Drawing. Continuation-in-part of application Ser. No.
154,881, Nov. 24, 1961. This application Jan. 28, 1964,
Ser. No. 340,808
9 Claims. (Cl. 65—21)

ABSTRACT OF THE DISCLOSURE

A spherical glass body having compressive strength in excess of 50,000 p.s.i. when notched to a depth of up to 30% of diameter, resistance to chemical attack and density less than 2.65 g./cc. and made by blending particulate glass with 0.25% to 0.75% acetylene black, mixing the blend with 1% to 5% graphite, adding 0.2% to 0.4% water, heating to a temperature such that the particulate glass spheroidizes, quenching from a temperature between softening and working and recovering the treated glass bodies.

---

This invention relates to glass bodies and more particularly to glass spheres and to a method for forming and heat treating such spheres. This application is a continuation-in-part of my copending application Ser. No. 154,881 filed Nov. 24, 1961, now Patent No. 3,242,032.

There has long been a demand for high strength spheres of glass for use as packing material for chemical reaction towers, as porous load supporting beds, as corrosion resistant rollers and for various other purposes. There has in addition been a very real need for an underground proppant for use in oil wells, gas wells, and the like to provide a path of fluid flow in a fractured formation. Various materials have been used with varying degrees of success. For example, graded sand has been used but it lacks sphericity and has no strength in larger sizes. Walnut shells and aluminum shot have been used but they tend to flatten out.

Glass spheres have heretofore been made in various ways but the products have always lacked the property of high strength and have been extremely sensitive to notches and scratches on the glass surface. Such spheres in the form of solid non-porous spheres have generally had compressive strengths less than 10,000 lbs. per square inch (p.s.i.) and even when higher strengths were achieved such spheres could only be used where there was no danger of scratching the sphere surface. Due to these limitations, the prior spheres were never seriously considered for uses such as underground proppants.

Accordingly, it is the main object of this invention to provide a glass body characterized by its sphericity; compressive strengths in excess of 50,000 p.s.i.; insensitivity to notches and scratches; and capable of resisting chemical attack for prolonged periods of time at temperatures of about 250° F.

It is another object to provide a process for forming and heat treating glass spheres.

Yet another object is to provide glass spheres which have particular utility as underground proppants in wells such as oil, gas and water wells.

I have produced a glass sphere which has a compressive strength in excess of 50,000 p.s.i. and usually above 100,000 p.s.i. and which can maintain this strength even when the surface has been scratched or notched to a depth of up to about 30% of the sphere diameter. These characteristics are unheard of in the art and represent remarkable advances over prior spheres.

In my preferred method for producing the above characterized glass spheres lime-soda-silicate glass cullet is blended with from about 0.25% by weight to about 0.75% by weight of acetylene black. One percent to about 6% by weight graphite and about .2% to about .4% by weight water is mixed with the acetylene black-glass cullet blend. This mix is then heated to a temperature high enough to permit surface tension to form spheres. The heat energy required to produce the temperature desired is provided from an external energy source such as for example from the combustion of fuel gases. It should be noted that there is no substantial combustion of the mix materials, e.g. carbon. The so-formed glass spheres are quenched from a temperature above the softening point of the lime-soda-silicate glass.

While I prefer to produce and heat treat spheres made from lime-soda-silicate glass, other glasses such as lead, borosilicate and high silica glasses could be employed.

The use of acetylene black has been found to be critical if the glass spheres free from notch sensitivity and having compressive strengths in excess of 100,000 p.s.i. are to be produced. I have found that the strengths of spheres made with acetylene black is superior to spheres made with any of the lampblacks or carbon blacks. In this respect, acetylene black is unique. It is postulated that acetylene black has certain critical characteristics which not only aid in the forming of the glass sphere but also have a beneficial effect on the heat treatment of the so-formed spheres. An acetylene black suited for practice of the invention is made by a process depending on the thermal decomposition of acetylene at temperatures of about 800° C.

I have also found that the percentage of acetylene black should be kept low in furnaces which have not been designed to keep air leaks to a minimum. Excessive acetylene black in a so-called "loose" furnace will merely burn and afford no advantage. Acetylene black in the range of 0.25 weight percent to 0.75 weight percent has produced remarkable results when used with about 1 to about 6% by weight graphite. The total weight of the carbon is kept extremely low so that the carbon will not combust and therefore will not act as a fuel.

The following table illustrates the remarkable improvement in strengths when acetylene black is added to a mix prepared from a lime-soda-silicate glass cullet.

TABLE I

| Carbon Content of Mix | Average Compressive Strength, p.s.i. | |
|---|---|---|
| | 8 x 12 mesh | 12 x 20 mesh |
| 6% graphite | 80,000 | 75,000 |
| 6% graphite plus ¼% acetylene black | 105,000 | 100,000 |
| 6% graphite plus ½% acetylene black | 108,000 | 103,000 |
| 5% graphite plus ½% acetylene black | 105,000 | 103,000 |

I have found that the higher the temperature from which the glass is quenched after the sphere is formed the higher the compressive strength will be. I have found that for high strength materials, it is necessary to quench from a temperature above the softening point of the glass. I have found that glasses may be air quenched to temperatures approaching 650° C. and then finally quenched according to the practices of my invention and obtain the high strengths characteristic of my invention. For example, glasses quenched by dropping through air from 1000° C. to a temperature of about 675° C. and then into a quenching medium at room temperature will have a higher strength than identical spheres which are treated by conventional air quenching practices.

I have also found that in my method of forming and heat treating glass spheres the heat treating quenching step may be carried out using any quenchant having a density less than the glass to be quenched. I have found that water may be used as the quenching fluid with good recoveries of product and good compressive strengths. However in order to use water, certain criticalities must be observed. To obtain high strength glass spheres, water must be vaporized and must become a gaseous heat transfer agent. This heat transfer agent must surround the glass sphere and act to keep the liquid (water) from wetting the glass surface.

As a general rule, glass must be softened prior to being quenched into any medium if high strength is to be realized. In the case of glass and water—the glass must be under sufficient tension so that when the glass actually becomes wet and is subjected to the terrific shock that attends the wetting, the rupture strength is not exceeded.

For maximum strength and greatest uniformity, a vapor shield should envelop the glass sphere over its entire surface. The sphere and its vapor shield should be free from any disturbing influences; i.e., contact with another sphere and/or vapor shield or contact with other heat absorbing surfaces. After the glass has been cooled to a point where the vapor shield dissolves and the water wets the sphere surface, contact with other objects will not cause damage.

The more perfect the spherical shape the more uniform will the forces of tension be within the body, primarily because of the uniformity of the vapor shield. Shapes having edges (a cube for example) do not lend themselves to the protection of the vapor shield.

A recovery approaching 100% can be assured if the above-mentioned requirements are met—even in water as long as the vapor shield is maintained during the cooling.

I have developed a successful method for quenching glass spheres in water. The following detailed description is presented for illustrative purposes only.

(1) Superheat the glass mix of the type described to form very smooth, highly spherical bodies. I prefer 1000° C. or about 1800° F. for soft glasses (container glass, light bulb glass, etc.).

(2) Roll the spheres into water so that the spheres are well spaced and not touching as they enter the water.

(3) Provide sufficient heat in the spheres so that a vapor shield is developed around the sphere at the time the sphere enters the water.

(4) Maintain the water bath at a specific temperature so as to control the heat transfer rate through the vapor shield.

(5) Control water bath temperature so as to control the size of or volume of vapor shield and consequently the buoyancy of the sphere-vapor shield unit. Water at 200° F. will cause spheres as large as $+\frac{3}{16}$ inch to float on the surface, supported by a vapor pad. Water at 75° F. will permit such sized spheres to sink below the water surface surrounded by a vapor shield.

(6) Regulate temperature of the sphere so that it will be plastic, but at the moment of reaching the water surface level it will develop a vapor shield covering and protection for the entire sphere surface.

(7) Maintain the depth of water so as to permit free fall of the spheres beyond the time when the vapor shield dissolves (or is absorbed by surrounding water).

(8) Regulate all temperatures (water and glass) so as to produce a quench and develop maximum tension within the sphere with a minimum of residual heat in the sphere when the vapor shield disappears.

The following example illustrates the type recoveries and strengths obtainable when glass spheres are made and heat treated using water as the quenchant according to my invention.

In this run, 8000 gms. of glass cullet sized to 8 x 14 mesh U.S. Series and having the approximate composition 73.6% $SiO_2$, 16.0% $Na_2O$, 0.6% $K_2O$, 5.2% CaO, 3.6% MgO, and 1.0% $Al_2O_3$ was blended with 240 gms. graphite powder, 40 gms. of 50% compression acetylene black and 60 cc. of tap water. The blended mix was fed to a 6-inch diameter externally heated rotary kiln. The kiln was heated to a maximum temperature of 960° C. The spheres immediately on leaving the kiln were quenched in ordinary tap water at room temperature. After washing and drying, the spheres were compression-tested between 25 $R_c$ steel plates at a beam loading speed of 0.01 inch per minute. Results are presented below.

Percent rec. _____ 88.75
Strength (p.s.i.):
    8 x 12 M _____ 144,250
    12 x 20 M _____ 140,660

Compressive strength was estimated according to the formula $$\frac{L_c}{D^2} = \text{P.s.i.}$$

where $L_c$ = critical load in pounds at failure
$D^2$ = diameter squared in inches.

The formula only applies to spherical bodies.

The practice of my invention will be further illustrated by reference to the following example.

Ordinary lime-soda-silicate glass was crushed to produce glass cullet feed of 8 x 14 M. The feed was mixed in the proportion of 2400 glass cullet, 84 graphite and 12 acetylene black. To this mixture was added 9 parts water. The blend was externally heated in a rotary kiln to a temperature of about 1000° C. until surface tension caused spheres to be formed. The spheres were discharged into a bath of 100% ethylene glycol at room temperature. The glass spheres were recovered and tested and found to have an average compressive strength in excess of 100,000 p.s.i. These tests were made by placing the spheres between two hardened steel plates (Rockwell C hardness of 25) and exerting a force on the plates so that there is essentially point contact on the spheres. The average compressive strength was in excess of 100,000 p.s.i.

The glass spheres so produced not only have good strength but have good sphericity which of course is beneficial to fracture flow capacity when using the spheres as well proppants.

Fracture flow capacity of spheres made according to the invention was compared to the fracture flow capacity of conventional proppants. The results of fracture flow capacity tests and other comparative physical data are set out in the following table.

TABLE

| Formation | Depth Equivalent, Over burden Pressure (p.s.i.) | Type | Size, U.S. Series Mesh | Concentration | | Fracture Flow Capacity (md.-ft.) | Remarks |
|---|---|---|---|---|---|---|---|
| | | | | Particles per in.² | Lb./gal. in Fracture | | |
| Aux Vases Sand | 3,000 | Sand | 10-20 | 125 | 6.0 | 17,000 | Moderately embedded, slightly crushed. |
| | | do | 8-12 | 64 | 6.0 | 8,000 | Moderately embedded, moderately crushed. |
| | | Rounded walnut shells | 6-8 | 10 | 0.8 | 20,000 | Slightly embedded, slightly pancaked. |
| | | Glass spheres | 6-8 | 31 | 5.9 | 118,000 | Moderately embedded, very slightly crushed. |
| | | Sand | 4-6 | 15 | 6.0 | 10,000 | Moderately embedded, very severely crushed. |
| | | Rounded walnut shells | 4-6 | 5 | 0.8 | 25,000 | Moderately embedded, slightly pancaked. |
| Connell Sand | 6,000 | Ottawa Sand | ¹10-20 | | | 700 | Slightly embedded, severely crushed. |
| | | Dowell Sand | ¹8-12 | | | <100 | Do. |
| | | Rounded walnut shells | 8-12 | 20 | 0.8 | 13,000 | Slightly embedded, moderately pancaked. |
| | | Aluminum pellets | 8-12 | 20 | | 48,000 | Do. |
| | | Glass spheres | 8-12 | 44 | 4.0 | 116,500 | Slightly embedded, very slightly crushed. |

¹ Monolayer pack.

The fracture flow capacity is recorded in millidarcy feet of flow (md.-ft.). This is a well recognized method in the oil industry of determining the effectiveness of propping agents. It is determined by multiplying the permeability in darcys by the width of the fracture in which the propping agent is placed. High fracture flow capacities mean larger recoveries from the fractured area and is of utmost significance to petroleum and gas recovery.

The glass spheres of my invention have other highly desirable characteristics. Tests have shown that spheres made by my process are substantially insensitive to notch. Compression tests were made on scratched beads made by the prior art and by my method. The prior art scratched spheres had average strengths of 32,300 p.s.i. My spheres had strengths of about 156,820 p.s.i. A scratch or notch must penetrate at least 30% of the diameter of my spheres to appreciably effect crush strength.

The glass spheres of my invention are resistant to chemical attack for prolonged periods at about 250° F.

My glass spheres do not deteriorate with formation of undesirable chemical by-products.

I have found that I may use as the starting material for the preparation of high strength proppants any of the higher melting heat resisting glasses as well as ordinary soft glasses.

I have found that in addition to water and ethylene glycol other quenching fluids which have a density less than the glass spheres may be used, e.g. aqueous solution of soap, starch and ethylene glycol, triethylene glycol and like materials.

I have found that such glass proppants as here herein described must have a density below that of about 2.65 gm./cc. in order that they may be properly suspended in conventional fracturing fluids which carry the proppant into the strata which is to be supported. These glass proppants are chemically inert at about 250° F. This is necessary in order to prevent their being chemically attacked and eroded by acid used in some fracturing operations. The pH range encountered in well stimulations may vary and the proppant must be able to withstand such varying conditions. Since the bottom hole temperatures of oil and gas wells may be considerably higher than the surface temperatures the proppant must be physically stable at temperatures of up to about 250° F. in order to satisfactorily serve as a proppant. In addition, the proppant to be pumpable must have smooth surfaces of generally spherical shape as well as high strength.

I claim:

1. A method for forming and heat treating spherical bodies of glass comprising the steps of
   (a) blending glass with from about 0.25 to about 0.75% acetylene black;
   (b) mixing said blend of glass and acetylene black with from about 1 to about 5% graphite;
   (c) adding about .2 to about .4% water of said mix;
   (d) heating the so-mixed materials without any substantial combustion of said materials to a temperature above the softening point of the glass so that the glass becomes plastic and its viscosity is reduced to permit surface tension so form spheres;
   (e) holding the heated mix at said temperature above the softening point until the softened glass forms spherical bodies by reason of its surface tension;
   (f) quenching these spherical bodies from a temperature between the softening point and the working temperature of the glass in a liquid having a density less than the density of the material to be quenched; and
   (g) recovering a heat treated spherical body having a crush strength of at least 100,000 p.s.i.

2. A method for forming and heat treating spherical bodies of lime-soda-silicate glass comprising the steps of
   (a) blending glass with from about 0.25 to about 0.75% acetylene black;
   (b) mixing said blend of glass and acetylene black with from about 1 to about 5% graphite;
   (c) adding about .2 to about .4% water to said mix;
   (d) heating the so-mixed materials without any substantial combustion of said materials to a temperature above the softening point of the glass so that the glass becomes plastic and its viscosity is reduced to permit surface tension to form spheres;
   (e) holding the heated mix at said temperature above the softening point until the softened glass forms spherical bodies by reason of its surface tension;
   (f) quenching these spherical bodies from a temperature between the softening point and the working temperature of the glass in a liquid having a density less than the density of the material to be quenched; and
   (g) recovering a heat treated spherical body having a crush strength of at least 100,000 p.s.i.

3. A process according to claim 1 wherein said liquid is water.

4. A process according to claim 1 wherein said liquid is ethylene glycol.

5. A process according to claim 1 wherein said liquid is triethylene glycol.

6. A process according to claim 1 wherein said liquid is aqueous solution of salt.

7. A process according to claim 1 wherein said liquid is aqueous solution of starch.

8. A process according to claim 1 wherein said liquid is aqueous solution of ethylene glycol.

9. A process according to claim 1 wherein said liquid is aqueous solution of triethylene glycol.

References Cited

UNITED STATES PATENTS

| 2,460,977 | 2/1949 | Davis et al. | 65—21 |
| 2,461,011 | 2/1949 | Taylor et al. | 65—21 |
| 3,242,032 | 3/1966 | Schott | 65—21 |

DONALL H. SYLVESTER, *Primary Examiner.*

G. R. MYERS, R. L. LINDSAY, *Assistant Examiners.*